(12) United States Patent
Lutz

(10) Patent No.: US 11,920,560 B2
(45) Date of Patent: Mar. 5, 2024

(54) TRANSMISSION GEARING FOR A WIND POWER PLANT OR AN ELECTRIC DRIVE FOR VEHICLES

(71) Applicant: Peter Lutz, Munich (DE)

(72) Inventor: Peter Lutz, Munich (DE)

( * ) Notice: Subject to any disclaimer, the term of this patent is extended or adjusted under 35 U.S.C. 154(b) by 659 days.

(21) Appl. No.: 17/080,337

(22) Filed: Oct. 26, 2020

(65) Prior Publication Data
US 2021/0079893 A1    Mar. 18, 2021

Related U.S. Application Data

(63) Continuation-in-part of application No. PCT/EP2019/060614, filed on Apr. 25, 2019.

(30) Foreign Application Priority Data

Apr. 25, 2018  (DE) .......................... 202018102326.8

(51) Int. Cl.
*F16H 7/02*       (2006.01)
*B60K 17/12*     (2006.01)
(Continued)

(52) U.S. Cl.
CPC .............. *F03D 15/00* (2016.05); *B60K 17/12* (2013.01); *F03D 9/25* (2016.05); *F16H 7/02* (2013.01);
(Continued)

(58) Field of Classification Search
CPC . F03D 15/00; F03D 9/25; B60K 17/12; F16H 7/02; F16H 37/027; F16H 37/06;
(Continued)

(56) References Cited

U.S. PATENT DOCUMENTS

| 804,980 A | 11/1905 | Reiss |
| 2,445,797 A | 7/1948 | Moore .......................... 180/19 |

(Continued)

FOREIGN PATENT DOCUMENTS

| CN | 101949445 A | * 1/2011 | ............ F03D 15/00 |
| DE | 41485 A | 11/1887 | |

(Continued)

OTHER PUBLICATIONS

Search Report dated Oct. 10, 2018 from the German Patent Office in the related foreign application DE202018102326.8; and English translation of the Oct. 10, 2018 Search Report (12 pages).

(Continued)

*Primary Examiner* — Justin Holmes
(74) *Attorney, Agent, or Firm* — Imperium Patent Works; Darien K. Wallace

(57) ABSTRACT

A transmission gearing includes a sun gear, a planetary unit and a high speed unit. The sun gear is mounted on a slowly rotating gear shaft. The planetary unit includes a planetary toothed gear wheel and a planetary shaft gear wheel, which are both mounted on a planetary shaft. The planetary shaft gear wheel has a diameter that is larger than that of the planetary toothed gear wheel and smaller than that of the sun gear. The planetary toothed gear wheel engages the sun gear. The high speed unit includes a quickly rotating gear shaft on which a high speed shaft gear is mounted. The high speed shaft gear has a diameter that is smaller than that of the planetary shaft gear wheel. A drive belt engages both the planetary shaft gear wheel and the high speed shaft gear. The slowly rotating gear shaft is parallel to the planetary shaft.

20 Claims, 8 Drawing Sheets

(51) Int. Cl.
*F03D 9/25* (2016.01)
*F03D 15/00* (2016.01)

(52) U.S. Cl.
CPC ... *F05B 2220/706* (2013.01); *F05B 2240/912* (2013.01); *F05B 2260/4021* (2013.01); *F05B 2260/40311* (2013.01); *F05B 2280/1011* (2013.01); *F05B 2280/1021* (2013.01); *F05B 2280/10304* (2013.01); *F05B 2280/6003* (2013.01)

(58) Field of Classification Search
CPC ............... F16H 37/02; F05B 2220/706; F05B 2240/912; F05B 2260/4021; F05B 2260/40311; F05B 2280/1011; F05B 2280/1021; F05B 2280/10304; F05B 2280/6003; F05B 2240/40; Y02E 10/72; Y02E 10/728
See application file for complete search history.

(56) References Cited

U.S. PATENT DOCUMENTS 8,568,099 B2 * 10/2013 Sabannavar ............ F03D 15/00
    416/170 R
8,912,681 B1 * 12/2014 Filkins .................... F03D 15/00
    290/55
9,033,109 B2    5/2015 Segovia et al. ..... F03D 11/0008
9,441,712 B1    9/2016 Tjensvoll et al. ........ F16H 9/26
9,879,768 B2    1/2018 Kolokythas ........... F16H 37/065

FOREIGN PATENT DOCUMENTS

| DE | 2937827 | A1 | 4/1981 | |
|---|---|---|---|---|
| DE | 4022073 | C1 | 10/1991 | |
| DE | 4200663 | A1 | 7/1993 | |
| DE | 60101218 | | 8/2004 | |
| EP | 0903433 | B1 | 9/2003 | |
| EP | 2687721 | A2 * | 1/2014 | ............. F03D 15/00 |
| GB | 2359606 | | 8/2001 | |

OTHER PUBLICATIONS

International Search Report dated Sep. 25, 2019 from the European Patent Office in the related PCT application PCT/EP2019/060614; and English translation of the Sep. 25, 2019 Search Report (26 pages).

* cited by examiner

TRANSMISSION GEARING FOR A WIND POWER PLANT OR AN ELECTRIC DRIVE FOR VEHICLES

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2019/060614, filed on Apr. 25, 2019, and published as WO 2019/207044 A1 on Oct. 31, 2019, which in turn claims priority from German Application No. 202018102326.8, filed in Germany on Apr. 25, 2018. This application is a continuation-in-part of International Application No. PCT/EP2019/060614, which is a continuation of German Application No. 202018102326.8. International Application No. PCT/EP2019/060614 is pending as of the filing date of this application, and the United States is an elected state in International Application No. PCT/EP2019/060614. This application claims the benefit under 35 U.S.C. § 119 from German Application No. 202018102326.8. The disclosure of each of the foregoing documents is incorporated herein by reference.

TECHNICAL FIELD

The present invention relates to a transmission gearing as well as to a wind power plant and an electric drive for vehicles that include such transmission gearing.

BACKGROUND

In wind power plants as well as in electric drives for vehicles and other applications, planetary gearings are frequently used, for example in the Winergy Multi Duored Gearbox of Winergy AG and of Flender GmbH in Germany. These gearings are required in wind turbines to translate the low rotational speed of the rotors into higher rotational speeds to operate generators. Planetary gearings are also used in electric drives for vehicles to translate the high rotational speeds of powerful electric motors into lower rotational speeds with high torques. Planetary gearings are pinion gears and therefore susceptible to shock and impact stresses such as, for instance, those caused by wind gusts in the case of wind turbines. Moreover, planetary gearings are comparatively heavy.

It is therefore an object of the present invention to provide a transmission gearing that is both lighter than a conventional planetary gear but yet achieves an equal output. Moreover, a transmission gearing is sought that is less sensitive to shock and impact stresses. Furthermore, it is an object of the invention to provide a wind power plant and an electric drive for vehicles that include such transmission gearing.

SUMMARY

The invention relates to a step-up gear mechanism that is lighter while having the same power as a conventional planetary gear. In addition, the step-up gear mechanism is less sensitive to impact and shock stresses. The invention further relates to a wind power plant and to an electric drive for vehicles that include the step-up gear mechanism. The invention relates to a planetary gear having gear wheel and drive belt components. Although conventional planetary gears with gear wheels can reliably transmit high power and torque, by using drive belts to drive gear shafts, fewer gear wheels are used in the step-up gear mechanism, and the weight of the step-up gear is reduced. In addition, the drive belts act as a damping element that absorb and dampen impact and shock stresses. The transmission to the planetary shaft wheels and the coupling using drive belts to a fast-rotor unit are performed by the planetary shaft wheel of each planetary unit. Each planetary unit is coupled to a fast-rotor shaft wheel of a fast-rotor unit by its own drive belt.

A transmission gearing that is lighter than a conventional planetary gear achieves the same output while being less sensitive to shock and impact stresses. Such a transmission gearing can be integrated into a wind power plant or an electric drive of a vehicle. The transmission gearing uses planetary gearing with pinion and drive belt components. Conventional planetary gearing that uses pinions is capable of safely transmitting high torques and outputs. By combining drive belts and drive shaft gears, the invention uses fewer pinions and reduces the weight of the transmission gearing. The drive belts act as damping elements that absorb and dampen shock and impact stresses. Drive belts on a high speed unit are used to couple a high speed shaft gear of a high speed unit to the planetary shaft gear of each planetary unit. Each planetary unit is coupled to a high speed shaft gear of a high speed unit by means of its own drive belt.

A transmission gearing includes a sun gear, a planetary unit, a high speed unit and a drive belt. The sun gear is mounted on a slowly rotating gear shaft. The planetary unit includes a planetary toothed gear wheel and a planetary shaft gear wheel. The planetary toothed gear wheel and the planetary shaft gear wheel are mounted on a planetary shaft. The planetary shaft gear wheel has a diameter that is larger than that of the planetary toothed gear wheel. The planetary toothed gear wheel engages the sun gear, which has a diameter that is larger than the diameter of the planetary shaft gear wheel. The high speed unit includes a quickly rotating gear shaft on which a high speed shaft gear is mounted. The high speed shaft gear has a diameter that is smaller than the diameter of the planetary shaft gear wheel. The drive belt engages both the planetary shaft gear wheel and the high speed shaft gear. The slowly rotating gear shaft and the planetary shaft are parallel to each other and arranged apart from each other.

A wind power plant for generating electric energy includes a transmission gearing with planetary gearings. The wind power plant has a tower with a rotatable platform disposed at an upper end of the tower. A rotor is attached to a rotor shaft that is mounted on the platform. A generator is also mounted on the platform. The transmission gearing mechanically couples the rotor shaft to the generator. The rotor shaft is mechanically coupled to a slowly rotating gear shaft. A quickly rotating gear shaft is mechanically coupled to the generator. A high speed shaft gear is mounted to the quickly rotating gear shaft. A planetary toothed gear wheel and a planetary shaft gear wheel are mounted on a planetary shaft. The planetary shaft gear wheel has a diameter that is larger than that of the planetary toothed gear wheel. The planetary toothed gear wheel engages a sun gear whose diameter is larger than that of the planetary shaft gear wheel. The high speed shaft gear has a diameter that is smaller than that of the planetary shaft gear wheel. The sun gear is fixedly attached to the slowly rotating gear shaft.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
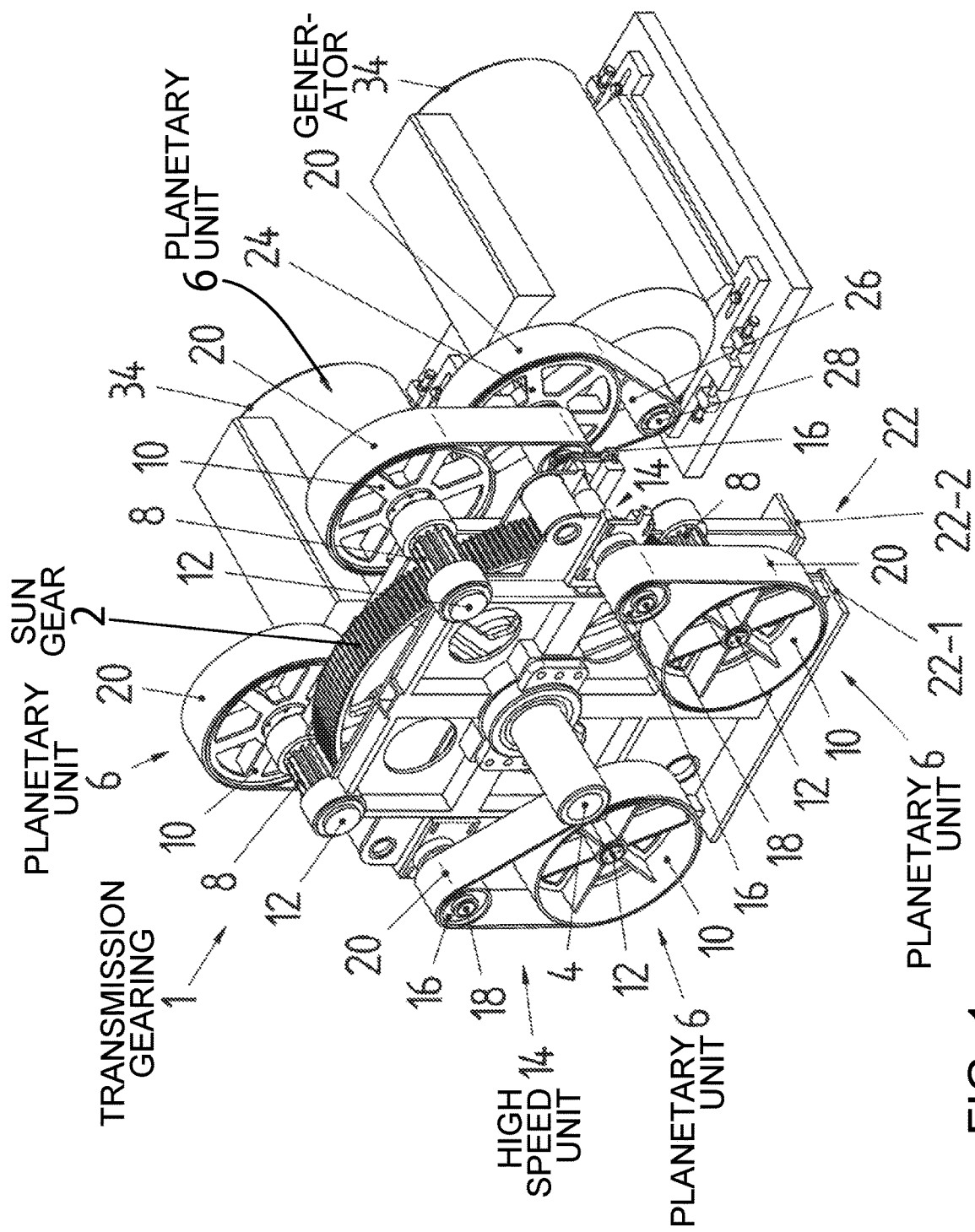
FIG. 1 is a perspective illustration of a first embodiment viewed from a side of the sun wheel.

FIG. 1 shows a transmission gearing 1 that incorporates planetary gears with pinion and drive belt components. Conventional planetary gearings with pinions are capable of safely transmitting high torques and outputs. Due to the combination of drive belts and drive shaft gears, fewer pinions are required, and the weight is reduced. In addition, the drive belts act as a damping element that absorbs and dampens shock and impact stresses. By the planetary toothed gear wheels of the planetary unit(s), the transmission on the planetary shaft gear wheels and the coupling is performed by means of drive belts on the high speed unit(s) 14. Each planetary unit 6 is coupled to a high speed shaft gear 16 of a high speed unit by means of its own drive belt.

A plurality of planetary units 6 can be used, which allows high torques and outputs to be translated. These planetary units 6 are of identical construction, which results in cost savings. An additional gear stage with a quickly rotating gear shaft 18 is arranged downstream of the high speed unit 14.

All shaft axes extend in parallel, but due to the drive belt 20, the quickly rotating gear shaft 18 can also be arranged at an acute angle to the other gear shafts.

The planetary units 6 are arranged symmetrically about the sun wheel 2 so as to distribute the stresses regularly.

With half of the planetary units 6, the respective planetary shaft gear wheels 10 are arranged to be displaced to the sun wheel 2 towards one side and, with the other half of the planetary units 6, the respective planetary shaft gear wheels 10 are arranged to be displaced to the sun wheel 2 towards the other side. The number of planetary toothed gear wheels 8 is thus equal to that of the planetary shaft gear wheels 10. The larger planetary shaft gear wheels 10 are, however, arranged on either side of the sun wheel 2, resulting in a simpler construction.

In one embodiment, each planetary unit 6 includes a planetary toothed gear wheel 8 and two planetary shaft gear wheels 10 arranged on opposite sides of the planetary toothed gear wheel 8. The planetary toothed gear wheel 8 engages the sun wheel 2. In this manner, the moments to be transmitted are transmitted to double the number of shaft gears and corresponding drive belts.

The high speed units 14 that act as a drive or output are picked up between two planetary units 6 via the drive belts.

The planetary shaft gear wheels 10 at both sides of the sun gear and the associated drive belts may be guided by one or a plurality of high speed units 14 with two high speed shaft gears 16 on the common quickly rotating gear shaft 18 or by one or a plurality of high speed units 14 with one high speed shaft gear 16 on two independent quickly rotating gear shafts. In the case of two independent quickly rotating gear shafts, for instance, two generators 34 may be driven.

The individual gear shafts may be mounted in a common frame or carrier 22. The carrier 22 can include a plurality of elements between which the gear shafts are mounted and one single element in which the gear shafts are mounted.

The transmission gearing 1 can include a cooling means. The pinion components are preferably equipped with active lubricating means.

A tensioning device with rollers keeps the drive belts 20 at the necessary tension to safely transmit the resulting torques. The drive belts 20 are preferably toothed belts so as to ensure the transmission of power between the shaft gears without slippage. Drive belts 20 with burls and complementary recesses in the shaft gears, or shaft gears with burls or teeth that engage complementary recesses in the drive belts 20 are also suitable. When smooth belts are used, they would have to be mounted with very high prestressing forces so as to avoid slip. These high prestressing forces reduce the service life of smooth belts.

Drive belts 20 of fiber reinforced plastic or titanium provide high tensile strength and are particularly suited to be used in the transmission gearing 1. Suitable plastics are in particular polyamide, carbon fiber-reinforced plastics and aramids, such as Kevlar. The planetary shaft gear wheels 10 and/or the pinion components may also be made of these materials. In the case of lower power output, e.g., when used as gearings for e-bikes, the pinions and/or the shaft gears may also be made of non-fiber-reinforced plastic.

The transmission gearing in accordance with the invention may advantageously be used as a gearing between the rotor and the generator of wind turbines. The slowly rotating rotor shaft 32 of a wind turbine is coupled to the slowly rotating gear shaft of the transmission gearing 1.

The transmission gearing 1 may be coupled to a plurality of generators. It is possible to couple one or a plurality of generators to the transmission gearing 1. In this manner, a partial load operational range can be taken into account. In the case of a strong wind, for instance, two generators are coupled to the transmission gearing, and in the case of a weak wind only one generator would remain coupled to the transmission gearing, and the second generator would be decoupled and hence preserved.

In an alternate design, the transmission gearing 1 in accordance with the invention is coupled to an electric motor. Here, the quickly rotating gear shaft 18 constitutes the drive, and the slowly rotating gear shaft 4 constitutes the output of the transmission gearing.

For the transmission gearing in accordance with the present invention, the following advantages result as compared to conventional gearings:

1. The belts provide for distinctly more running smoothness and are very easy to exchange.

2. The gearing has less complex moving parts. Lubrication is partially omitted.

3. The gearing is distinctly lighter than comparable conventional gearings.

4. The weight saving has a positive effect during installation, operation and maintenance of the gearing.

5. The toothed belts may be exchanged prophylactically in the scope of regular maintenance with relatively little effort.

6. The torque output may be transmitted from the sun wheel 2 to the respective shaft gears by a plurality of pinions largely decoupled from each other.

Figure 2:
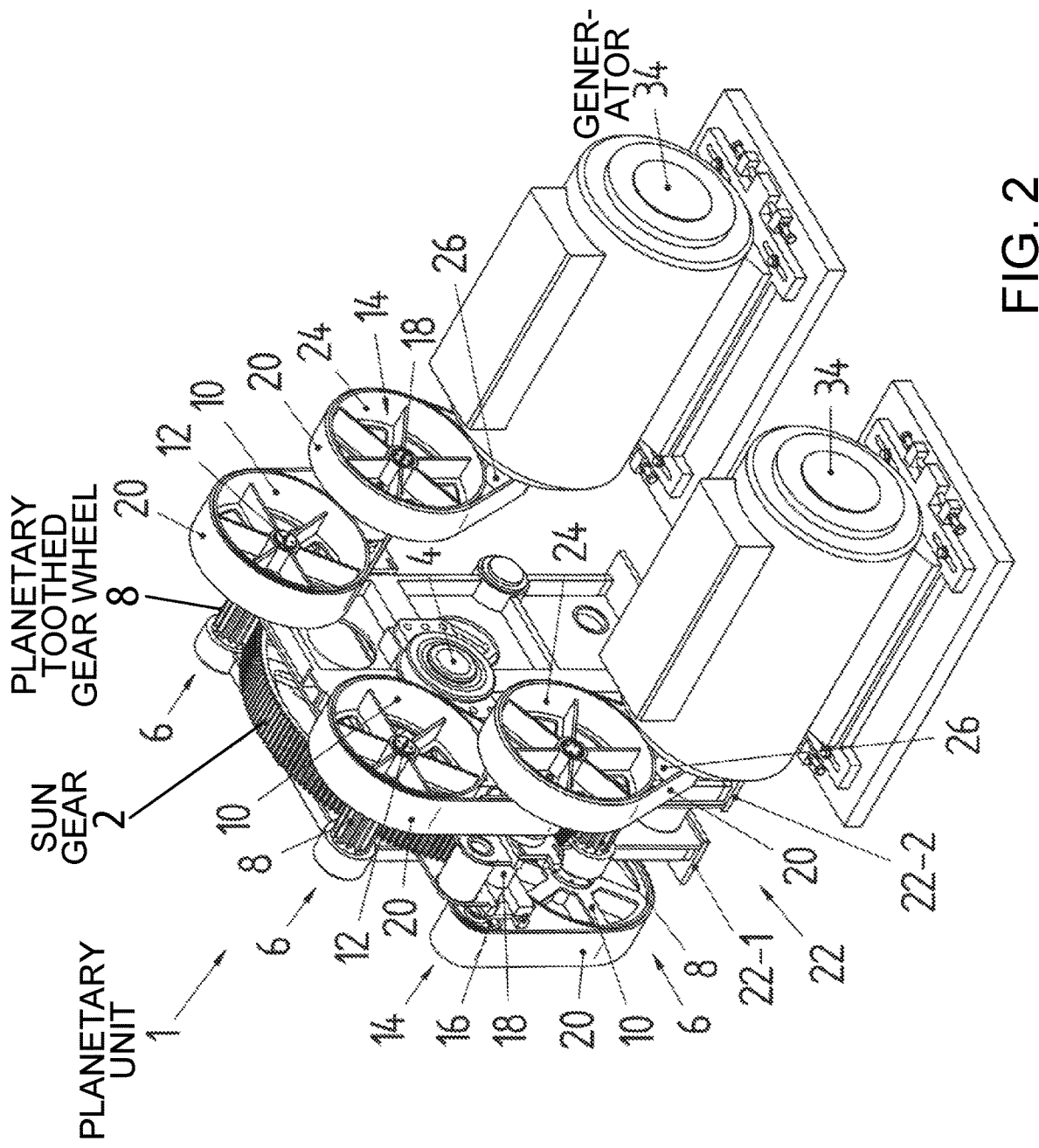
FIG. 2 is a perspective illustration of a first embodiment viewed from the other side of the sun wheel on which the generators are arranged.
Figure 3:
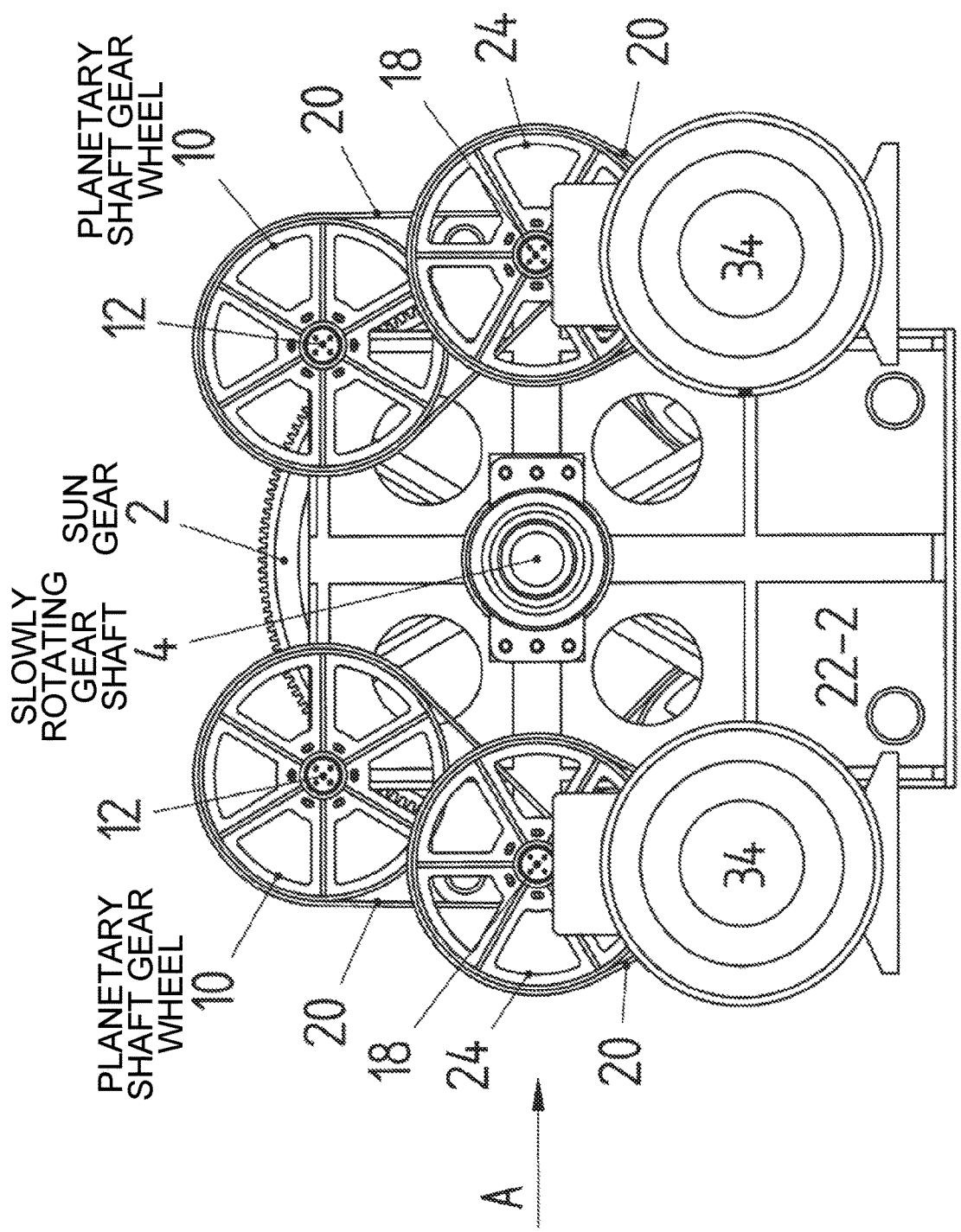
FIG. 3 is a view of the first embodiment viewed from the side of the generators.
Figure 4:
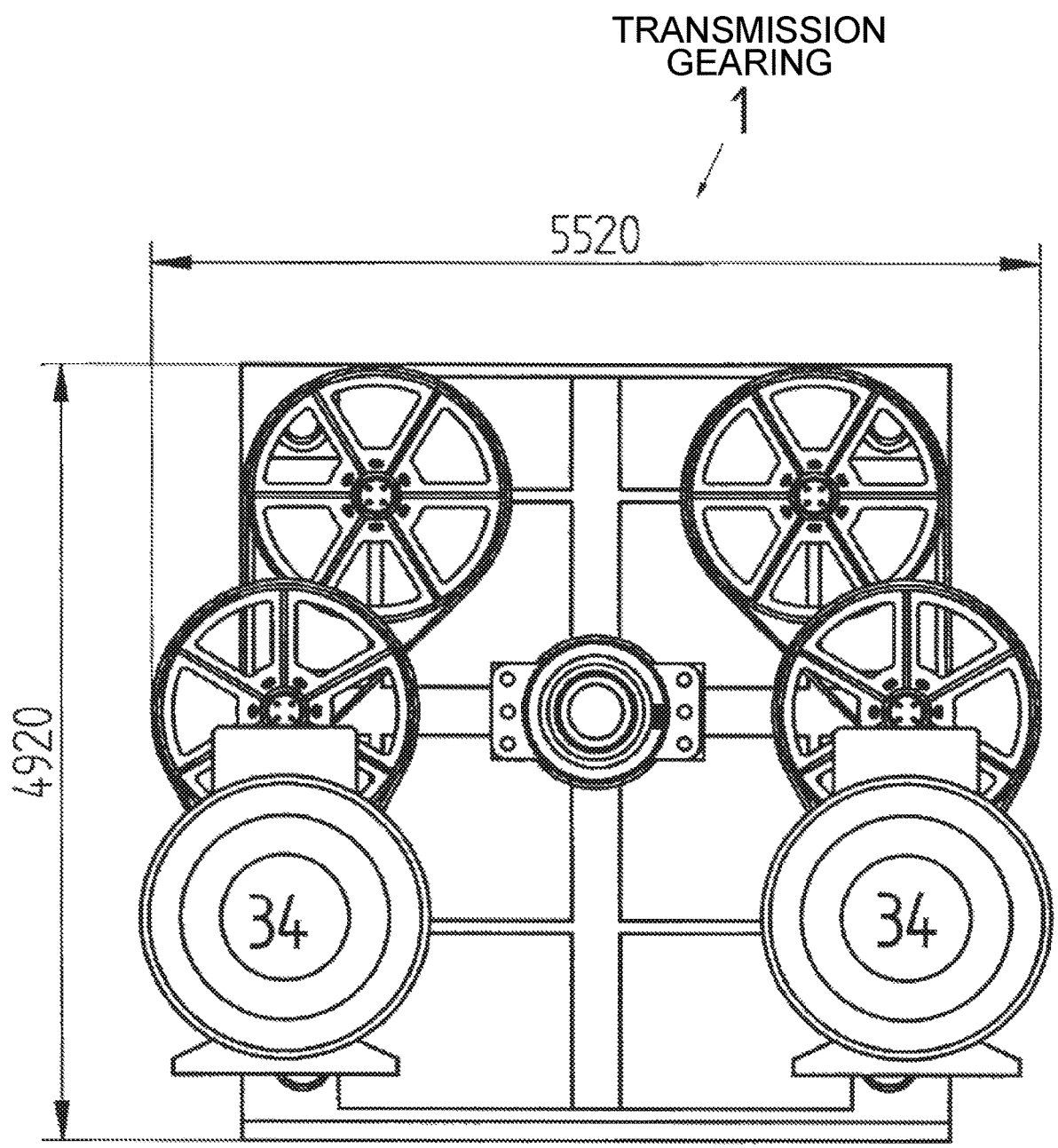
FIG. 4 is an illustration of the first embodiment of FIG. 3 with an exemplary dimensioning in millimeters.
Figure 5:
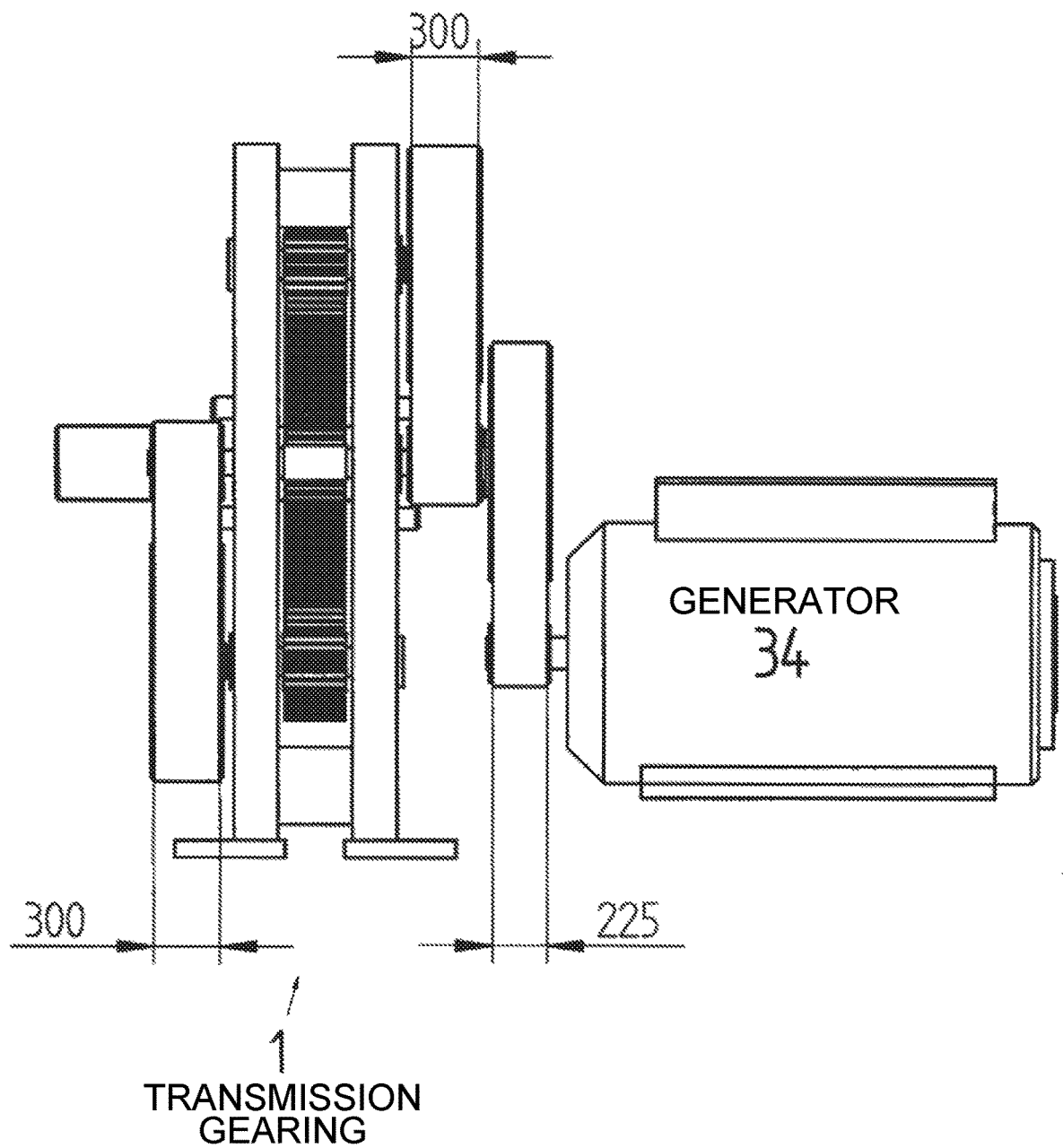
FIG. 5 is a side view in the direction of arrow A in FIG. 3 with an exemplary dimensioning in millimeters.

FIG. 1 shows a first embodiment of a transmission gearing 1 that includes a sun wheel or sun gear 1, four planetary units 6 and two high speed units 14. The two high speed units 14 drive two generators 34 via third gear stages. FIG. 2 is a perspective view from the opposite side of the sun wheel 2 on which the generators 34 are located. FIG. 3 is a side view of the first embodiment from the side of the generators 34. FIG. 4 is a schematic side view of the first embodiment from the side of the generators 34 listing the exemplary dimensions in millimeters. FIG. 5 is a schematic view showing the first embodiment as seen from arrow A in FIG. 3 perpendicular to the sun wheel 2, listing the exemplary dimensions in millimeters.

The sun wheel 2 is arranged between first and second retaining plates 22-1, 22-2 on a slowly rotating gear shaft 4, which is rotatably mounted in the two retaining plates 22-1, 22-2. The two retaining plates 22-1 and 22-2 form a common frame or carrier 22. Each of the four planetary units 6 includes a planetary toothed gear wheel 8 and a planetary shaft gear wheel 10. The planetary toothed gear wheel 8 and the planetary shaft gear wheel 10 are attached to on a common planetary shaft 12 rotatably mounted in the retaining plates 22-1, 22-2. The smaller planetary toothed gear wheels 8 mesh with the sun wheel 2 and rotate the larger planetary shaft gear wheels 10, which together form a first gear stage. Two planetary units 6 are mounted in the first retaining plate 22-1, and two planetary units 6 are mounted in the second retaining plate 22-2. One respective planetary unit 6 that is mounted in the first and second retaining plates 22-1, 22-2 is coupled via a drive belt 20 to one of the two high speed units 14. Each high speed unit 14 includes a quickly rotating gear shaft 18 rotatably mounted in the first and second retaining plates 22-1, 22-2. Each high speed unit 14 includes two high speed shaft gears 16 that are arranged on the outer sides of the two retaining plates 22-1 and 22-2 in the end region of the respective quickly rotating gear shaft 18. The drive belts 20 couple the four planetary shaft gear wheels 10 to the four high speed shaft gears 16. The diameter of the planetary shaft gear wheels 10 is larger than the diameter of the high speed shaft gears 16. The planetary shaft gear wheels and the high speed shaft gears form a second gear stage.

A first shaft gear 24 of a third gear stage is arranged at the ends of the two quickly rotating gear shafts 18 that face the generators 24. Each of the first shaft gears 24 of the third gear stage is coupled via a drive belt 20 to a second shaft gear 26 of the third gear stage. Each second shaft gear 26 has a smaller diameter than each first shaft gear 24. Each second shaft gear 26 of the third gear stage is attached to an additional quickly rotating gear shaft 28 that forms the generator shaft and drives each of the two generators 34.

Alternatively, the two second shaft gears 26 of the third gear stage can be arranged on a common additional quickly rotating gear shaft 28 that forms the generator shaft of a single generator 34.

Figure 6:
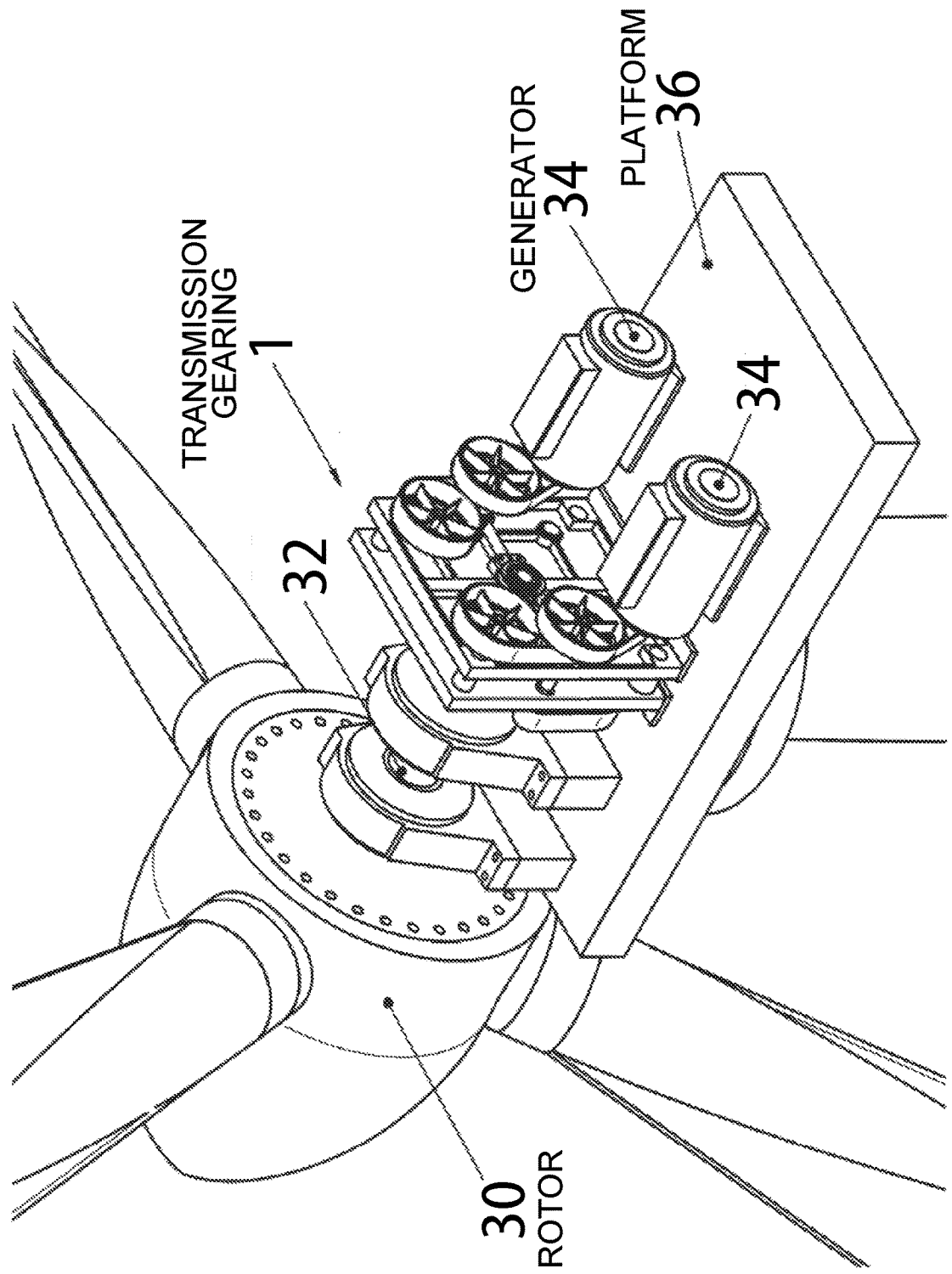
FIG. 6 is a perspective illustration of a wind turbine with the transmission gearing of FIG. 1 plus two generators.

FIG. 6 schematically illustrates the use of the transmission gearing 1 in a wind power plant with a rotor 30 that is coupled to a rotor shaft 32 on a common platform 36. The rotor shaft 32 forms the slowly rotating gear shaft 4 of the transmission gearing 1.

The following gear ratios are possible with the transmission gearing illustrated in FIGS. 1-6:

sun wheel/planetary toothed gear wheels 1:10
planetary shaft gear wheel/high speed shaft gear 1:3.571
third gear stage 1:3.571

In the case of a rotor speed of a wind power plant of twelve revolutions per minute, a total speed of 1530.42 revolutions per minute will result at the generator. This means that it is possible to employ comparatively small and hence light generators.

Figure 7:
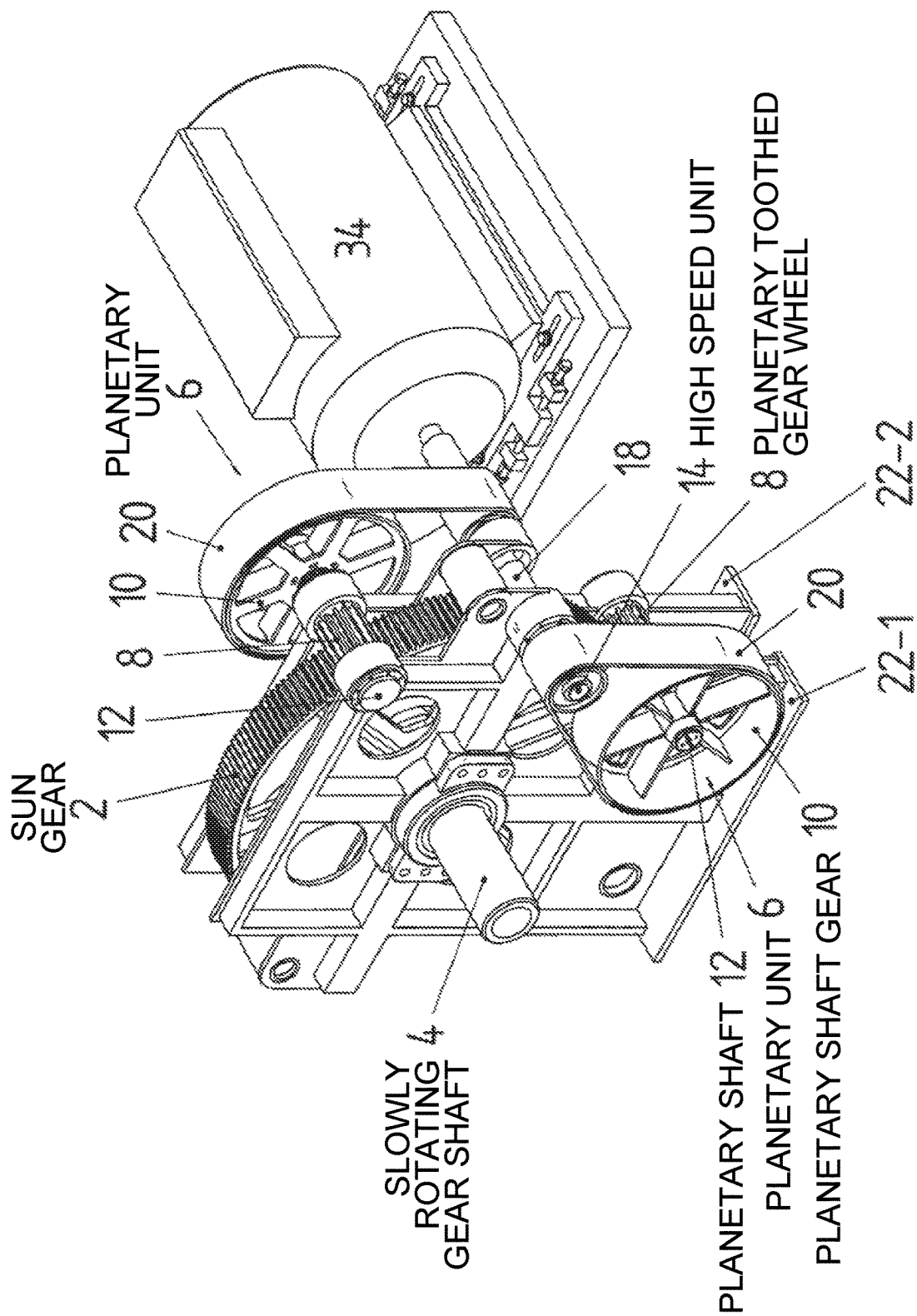
FIG. 7 is a perspective illustration of a second embodiment that has two planetary units, one high speed unit and one generator.

FIG. 7 shows an illustration of a second embodiment of the invention, which differs from the first embodiment of FIGS. 1-6 by the fact that the transmission gearing of FIG. 7 includes only two planetary units 6, one high speed unit 14 and one generator 34. The second embodiment includes no third gear stage. The quickly rotating gear shaft 18 forms the generator shaft of the sole generator 34.

Figure 8:
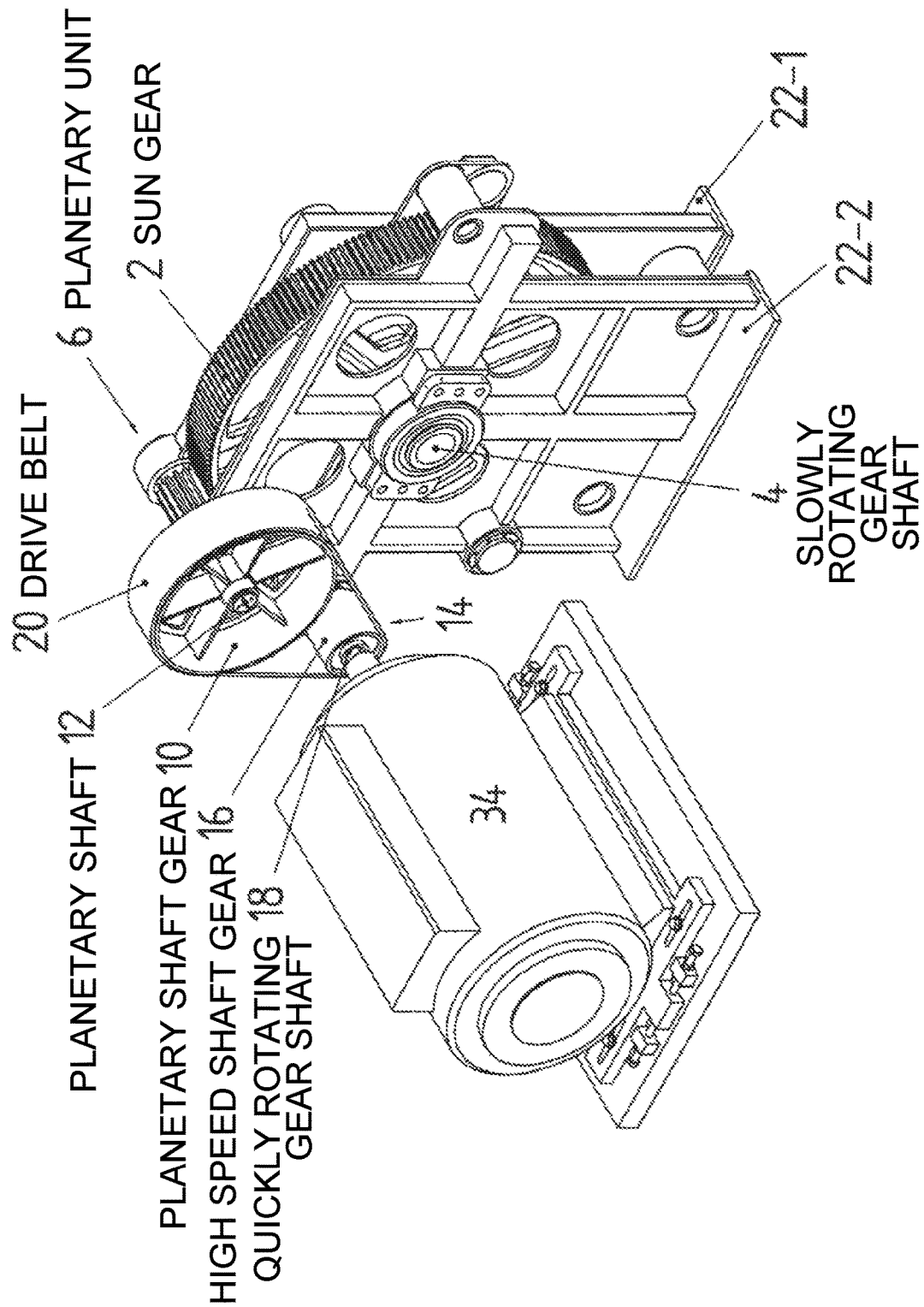
FIG. 8 is a perspective illustration of a third embodiment that has one planetary unit, one high speed unit and one generator.

FIG. 8 shows an illustration of a third embodiment of the invention, which differs from the first embodiment of FIGS. 1-6 in that the transmission gearing includes only one planetary unit 6, one high speed unit 14 and one generator 34. The third embodiment includes no third gear stage. The quickly rotating gear shaft 18 forms the generator shaft of the sole generator 34.

The second and third embodiments are suited for lower power outputs and are simpler in construction.

LIST OF REFERENCE NUMBERS 1 transmission gearing
2 sun wheel
4 slowly rotating gear shaft
6 planetary unit
8 planetary toothed gear wheel
10 planetary shaft gear wheel
12 planetary shaft
14 high speed unit
16 high speed shaft gear
18 quickly rotating gear shaft
20 drive belt
22 common frame or carrier
22-1 first retaining plate
22-2 second retaining plate
24 first shaft gear third gear stage
26 second shaft gear third gear stage
28 additional quickly rotating gear shaft
30 rotor
32 rotor shaft
34 generator
36 common platform Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A transmission gearing, comprising:
a sun gear mounted on a slower rotating gear shaft;
a first planetary unit that includes a first planetary toothed gear wheel and a first planetary shaft gear wheel, wherein the first planetary toothed gear wheel and the first planetary shaft gear wheel are mounted on a first planetary shaft, wherein the first planetary shaft gear wheel has a diameter that is larger than that of the first planetary toothed gear wheel, wherein the first planetary toothed gear wheel engages the sun gear, and wherein the sun gear has a diameter that is larger than the diameter of the first planetary shaft gear wheel;

a high speed unit that includes a faster rotating gear shaft on which a high speed shaft gear is mounted, wherein the high speed shaft gear has a diameter that is smaller than the diameter of the first planetary shaft gear wheel;

a drive belt that engages both the first planetary shaft gear wheel and the high speed shaft gear, wherein the slower rotating gear shaft and the first planetary shaft are parallel to each other and arranged apart from each other; and a second planetary unit that includes a second high speed shaft gear, wherein the second high speed shaft gear is mounted at a distance from the high speed shaft gear on the faster rotating gear shaft of the high speed unit, and wherein a second drive belt engages the second high speed shaft gear of the second planetary unit.

2. The transmission gearing of claim 1, further comprising:
a second planetary unit that includes a second planetary toothed gear wheel and a second planetary shaft gear wheel, wherein the second planetary toothed gear wheel and the second planetary shaft gear wheel are mounted on a second planetary shaft.

3. The transmission gearing of claim 2, wherein the first planetary unit and the second planetary unit are arranged symmetrically on opposite sides of the sun gear.

4. The transmission gearing of claim 2, wherein the first planetary shaft gear wheel is disposed on one side of the sun gear, and the second planetary shaft gear wheel is disposed on an opposite side of the sun gear.

5. The transmission gearing of claim 4, further comprising:
a third planetary unit that includes a third planetary shaft gear wheel; and
a fourth planetary unit that includes a fourth planetary shaft gear wheel, wherein the first planetary shaft gear wheel and the second planetary shaft gear wheel are disposed on opposite sides of the sun gear, wherein the third planetary shaft gear wheel and the fourth planetary shaft gear wheel are disposed on opposite sides of the sun gear, and wherein the first planetary shaft gear wheel and the third planetary shaft gear wheel are disposed on the same side of the sun gear.

6. The transmission gearing of claim 2, further comprising:
a second drive belt that engages the second planetary shaft gear wheel, wherein the drive belt and the second drive belt have equal lengths.

7. The transmission gearing of claim 1, wherein a first shaft gear of a third gear stage is mounted on the faster rotating gear shaft of the high speed unit, wherein a second shaft gear of the third gear stage is mounted on a second faster rotating gear shaft, and wherein a second drive belt wraps around the first shaft gear and the second shaft gear of the third gear stage and engages both the first shaft gear and the second shaft gear.

8. The transmission gearing of claim 7, wherein the first shaft gear of the third gear stage and the first planetary shaft gear wheel have equal diameters.

9. The transmission gearing of claim 7, wherein the second shaft gear of the third gear stage and the high speed shaft gear have equal diameters.

10. The transmission gearing of claim 1, wherein the drive belt rotationally couples the planetary shaft to the faster rotating gear shaft.

11. The transmission gearing of claim 1, wherein the slower rotating gear shaft and the faster rotating gear shaft are parallel to each other and arranged apart from each other.

12. The transmission gearing of claim 1, wherein the transmission gearing includes an even number of planetary units with planetary shaft gear wheels, and wherein half of the planetary shaft gear wheels are arranged on one side of the sun gear, and the other half of the planetary shaft gear wheels are arranged on the other side of the sun gear.

13. The transmission gearing of claim 1, further comprising:
a second high speed unit.

14. The transmission gearing of claim 1, wherein the faster rotating gear shaft, the first planetary shaft and the slower rotating gear shaft are mounted on a common frame.

15. The transmission gearing of claim 1, wherein the drive belt has teeth, and wherein the first planetary shaft gear wheel has complementary recesses.

16. The transmission gearing of claim 1, wherein the sun gear is made of a substance selected from the group consisting of: plastic, fiber-reinforced plastic, steel, cast iron, aluminum and titanium.

17. A transmission gearing, comprising:
a sun gear mounted on a slower rotating gear shaft;
a first planetary unit that includes a first planetary toothed gear wheel and a first planetary shaft gear wheel, wherein the first planetary toothed gear wheel and the first planetary shaft gear wheel are mounted on a first planetary shaft, wherein the first planetary shaft gear wheel has a diameter that is larger than that of the first planetary toothed gear wheel, wherein the first planetary toothed gear wheel engages the sun gear, and wherein the sun gear has a diameter that is larger than the diameter of the first planetary shaft gear wheel;
a high speed unit that includes a faster rotating gear shaft on which a high speed shaft gear is mounted, wherein the high speed shaft gear has a diameter that is smaller than the diameter of the first planetary shaft gear wheel; and
a drive belt that engages both the first planetary shaft gear wheel and the high speed shaft gear, wherein the slower rotating gear shaft and the first planetary shaft are parallel to each other and arranged apart from each other, wherein the first planetary unit also includes a secondary planetary shaft gear wheel mounted on the first planetary shaft, wherein the first planetary shaft gear wheel and the secondary planetary shaft gear wheel are disposed on opposite sides of the first planetary toothed gear wheel, and wherein the high speed unit also includes a second high speed shaft gear mounted on the faster rotating gear shaft.

18. A wind power plant for generating electric energy, comprising:
a tower having a rotatable platform disposed at an upper end of the tower;
a rotor attached to a rotor shaft, wherein the rotor shaft is mounted on the platform;
a generator mounted on the platform; and
a transmission gearing that mechanically couples the rotor shaft to the generator, wherein the rotor shaft is mechanically coupled to a slower rotating gear shaft, wherein a faster rotating gear shaft is mechanically coupled to the generator, wherein a high speed shaft gear is mounted to the faster rotating gear shaft, wherein a planetary toothed gear wheel and a planetary shaft gear wheel are mounted on a planetary shaft, wherein a planetary shaft gear wheel has a diameter that is larger than that of the planetary toothed gear wheel, wherein the planetary toothed gear wheel engages a sun gear whose diameter is larger than that of the planetary shaft gear wheel, wherein the high speed shaft gear has a diameter that is smaller than that of the planetary shaft gear wheel, and wherein the sun gear is fixedly attached to the slower rotating gear shaft, wherein a second high speed shaft gear is mounted at a distance from the high speed shaft gear on the faster rotating gear shaft, and wherein a second drive belt engages the second high speed shaft gear.

19. The wind power plant of claim 18, wherein the transmission gearing is coupled to a plurality of generators.

20. An electric drive for a vehicle, comprising:
an electric motor that includes a motor shaft and a transmission gearing, wherein the motor shaft is coupled to a faster rotating gear shaft of the transmission gearing, wherein a high speed shaft gear is mounted to the faster rotating gear shaft, wherein a planetary toothed gear wheel and a planetary shaft gear wheel are mounted on a planetary shaft, wherein a planetary shaft gear wheel has a diameter that is larger than that of the planetary toothed gear wheel, wherein the planetary toothed gear wheel engages a sun gear whose diameter is larger than that of the planetary shaft gear wheel, wherein the high speed shaft gear has a diameter that is smaller than that of the planetary shaft gear wheel, and wherein the sun gear is fixedly attached to a slower rotating gear shaft that is coupled to a drive shaft of the vehicle, wherein a second high speed shaft gear is mounted at a distance from the high speed shaft gear on the faster rotating gear shaft, and wherein a second drive belt engages the second high speed shaft gear.

* * * * *